United States Patent Office 3,045,171
Patented July 17, 1962

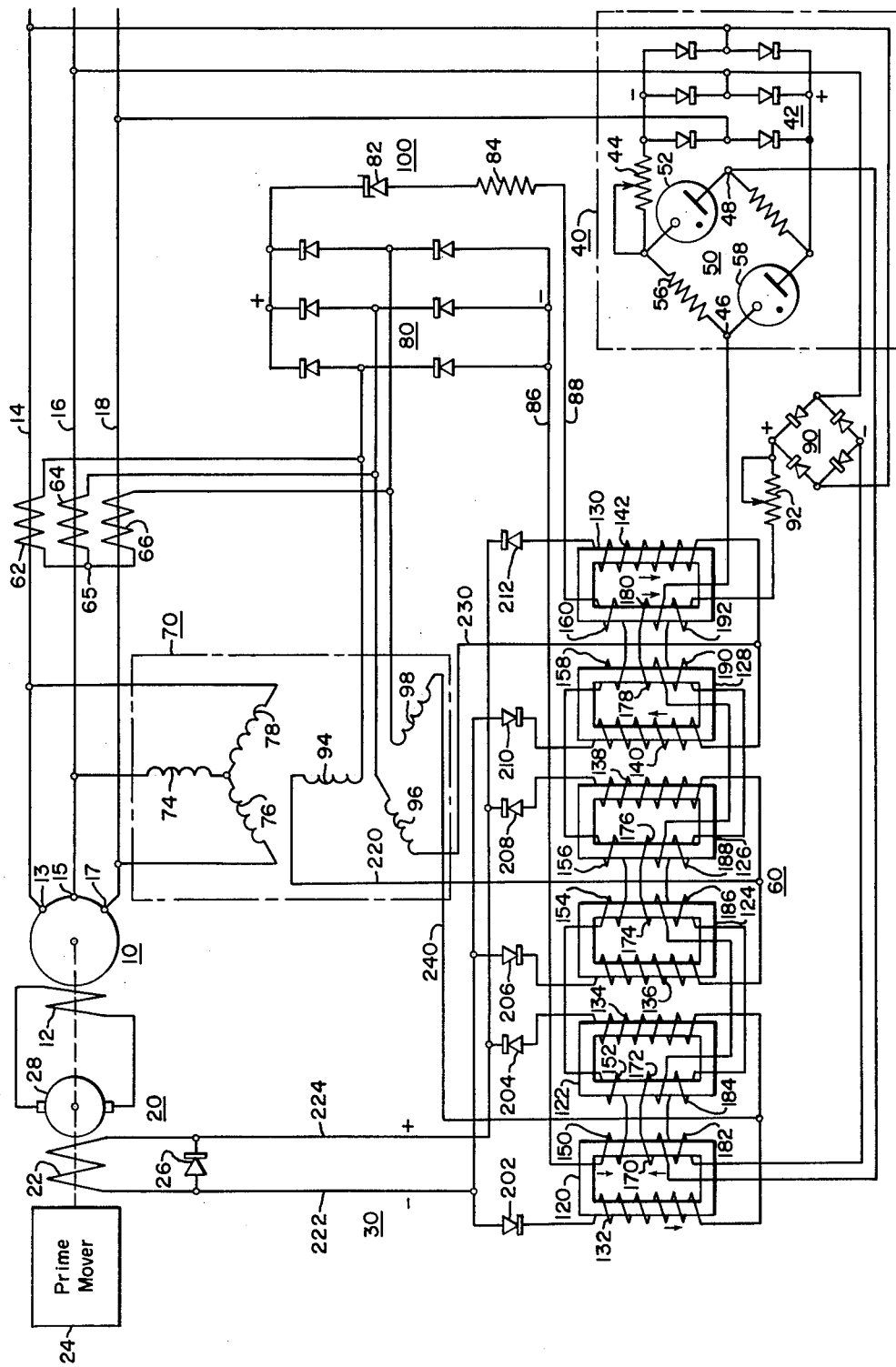

3,045,171
ELECTRICAL CONTROL APPARATUS
James F. Heins and Robert L. Gasperetti, Lima, Ohio, assignors to Westinghouse Electric Corporation, East Pittsburgh, Pa., a corporation of Pennsylvania
Filed Mar. 2, 1959, Ser. No. 796,573
8 Claims. (Cl. 322—25)

This invention relates to excitation systems for dynamoelectric machines, such as synchronous generators, and, more particularly, to electrical control apparatus, such as regulator systems, for controlling said excitation systems.

In certain applications of dynamoelectric machines, such as synchronous generators, having an excitation field winding, it is necessary that the generator supply an output current of at least a predetermined value during certain operating conditions, such as short-circuit or fault conditions. The output current under such conditions may be necessary to actuate associated protective equipment, such as circuit breakers, fuses or protective relays. A conventional method of providing excitation current to the field winding of a generator during short-circuit conditions is to provide current transformers which are responsive to the output current of said generator. In an excitation system for a synchronous generator controlled by an electrical control apparatus, such as a regulator system, the regulator system ensures that an excitation system of the type described supplies sufficient excitation current to the associated generator during short-circuit or fault conditions.

A problem arises in a conventional excitation system of the type described when the prime mover driving the generator is subject to a wide range of speeds during operation, such as in aircraft applications. This is because, if the excitation system and the associated regulator system which controls said excitation system, are arranged to provide sufficient excitation during short-circuit conditions at the lowest speed of the generator in the normal range of operating speeds, then the excitation supplied to said generator during short-circuit conditions at the highest speed in the normal range of operating speeds will be excessive. As a result, the protective equipment associated with the generator must be designed to handle or interrupt the short-circuit currents associated with the highest speed of the generator. It is, therefore, desirable to provide an excitation system of the type described in which sufficient excitation is supplied to the associated dynamoelectric machine under short-circuit or fault conditions and in which excessive excitation is prevented under certain operating conditions.

It is an object of this invention to provide a new and improved excitation system for a dynamoelectric machine, such as a synchronous generator.

Another object of this invention is to provide a new and improved electrical control apparatus, such as a regulator system, for controlling the excitation supplied to a dynamoelectric machine.

A further object of this invention is to provide a regulator system for controlling the excitation supplied to a dynamoelectric machine, such as a synchronous generator, in which the excitation supplied to said machine under certain operating conditions is limited.

A more specific object of this invention is to provide a regulator system for controlling the excitation supplied to a dynamoelectric machine, such as a synchronous generator, said excitation being supplied by means responsive to both the output voltage and the output current of said machine in which the excitation supplied in response to said output current is limited under certain operating conditions.

Other objects of the invention will, in part, be obvious and will, in part, appear hereinafter.

For a fuller understanding of the nature and objects of the invention, reference should be had to the following detailed description taken in connection with the accompanying drawing, the single FIGURE of which is a schematic diagram showing an illustrative embodiment of the invention.

Referring now to the drawing, there is illustrated a dynamoelectric machine, specifically a synchronous generator 10 having an excitation field winding 12 and output terminals 13, 15 and 17. In this instance, the generator 10 is disposed to supply electric power through the output terminals 13, 15 and 17 to a load (not shown) connected at the line conductors 14, 16 and 18, which are part of a three-phase electrical system. In order to obtain an excitation voltage across the field winding 12 of a relatively large magnitude, an exciter 20 is provided. The generator 10 and the exciter 20 are both driven by a suitable prime mover 24, as shown, which may be the main engine of an airplane and which is subject to a wide range of speeds during normal operation. In this instance, the exciter 20 comprises an armature 28 which supplies current to the field winding 12 of the generator 10 and a separate excitation field winding 22. The excitation current supplied to the excitation field winding 22 of the exciter 20 is provided by a first transformer means 70 which is responsive to the output voltage of the generator 10 and a second transformer means comprising the current transformers 62, 64 and 66, which is responsive to the output current of the generator 10. In order to maintain the output voltage of the synchronous generator 10 at substantially a predetermined regulated value, a regulator system 30 is connected between said transformer means and the excitation field winding 22 of the exciter 20. In order to prevent said transformer means, as controlled by said regulator system, from supplying excessive excitation to the generator 10 during short-circuit conditions and during other operating conditions, the limiting means 100 is connected in circuit relation with said transformer means and the regulator system 30.

In general, the regulator system 30 comprises an error detecting circuit 40 for producing a direct current error signal or voltage which is a measure of the deviation of the output terminal voltage of the synchronous generator 10 from a reference voltage or its regulated value, and control means, specifically a magnetic amplifier 60, for producing an output excitation current which varies with the error signal from the error detecting circuit 40 and which is applied to the field winding 22 of the exciter 20. The regulator system 30 operates to provide excitation current to the field winding 12 of the generator 10 from the first and second transformer means which is varied in accordance with the output voltage of the generator 10 in order to maintain the output voltage of the generator 10 at the predetermined regulated value.

In this instance, the error detecting circuit 40 comprises a well-known bridge circuit 50, a rheostat 44, and a three-phase full-wave rectifier 42. The input of the full-wave rectifier 42 is connected to be responsive to the output terminal voltage of the generator 10 at the conductors 14, 16 and 18. It is to be understood that a potential transformer may be interposed between the input of the rectifier 42 and the conductors 14, 16 and 18, where required in a particular application. The output of the full-wave rectifier 42 is connected across the input terminals of the bridge circuit 50 through the rheostat 44. The bridge circuit 50 includes two parallel branches, a first branch comprising the resistor 56 connected in series circuit relationship with the voltage regulating tube 58 and a second branch comprising the voltage regulating tube 52 and the resistor 54 connected in series circuit relationship. The voltage regulating tubes 52 and 58 may be of the gas discharge type, but it is to be understood that semiconductor diodes, preferably of the type known to the art as Zener diodes, may be substituted for said tubes. The output voltage or signal of the error detecting circuit 40 appears at the output terminals 46 and 48 of the bridge circuit 50.

In the operation of the error detecting circuit 40, the direct current output voltage of the full-wave rectifier 42 is a direct current measure of the output terminal voltage of the generator 10. The rheostat 44 is provided in order to vary the portion of the output voltage of the full-wave rectifier 42 that is applied to the input terminals of the bridge circuit 50. During operation, the direct current voltage across the voltage regulating tubes 52 and 58 remains substantially constant since the voltage applied to the tubes 52 and 58 is always of a greater magnitude than the breakdown voltage of said tubes. It will be seen that when a direct current voltage is applied at the input terminals of the bridge circuit 50, which is equal to twice the voltage drop across each of the tubes 52 and 58, there will be no voltage difference existing across the output terminals of the error detecting circuit 40. When, however, the voltage across the input terminals of the bridge circuit 50 is either above or below the reference voltage of the bridge circuit 20, which is twice the voltage drop across each of the tubes 52 and 58, then a voltage difference will exist across the output terminals 46 and 48 of the error detecting circuit 40. The polarity of the output voltage or signal of the error detecting circuit 40 at the terminals 46 and 48 will depend upon whether the input voltage is above or below the reference voltage of the bridge circuit 50. In the normal range of operation of the regulating system 30, as illustrated, the polarity of output voltage from the error detecting circuit 40 applied to the magnetic amplifier 60 may reverse in a particular application. The rheostat 44 is adjusted initially to obtain the desired magnitude and polarity of the output error voltage from the error detecting circuit 40. The setting of the rheostat 44 is also changed to adjust the regulated value of voltage at which the regulator system 30 maintains the output terminal voltage of the generator 10.

As hereinbefore mentioned, the three-phase magnetic amplifier 60 is responsive to the output signal of the error detecting circuit 40 in controlling the excitation current supplied to the excitation field winding 22 of the exciter 20 from the first transformer means 70 and the second transformer means, comprising the current transformers 62, 64 and 66. As illustrated, the magnetic amplifier 60 comprises the magnetic core members 120, 122, 124, 126, 128 and 130, which have disposed in inductive relationship therewith the load windings 132, 134, 136, 138, 140 and 142, respectively. In this instance, the load windings 132, 134, 136, 138, 140 and 142 have connected in series circuit relationship therewith, the self-saturating rectifiers 202, 204, 206, 208, 210 and 212, respectively, in order to ensure that current flows in only one direction through the respective load windings. As illustrated, the load windings 132, 136 and 140 are so connected to a conductor 222 and the load windings 134, 138 and 142 are so connected to a conductor 224 that the output current of the magnetic amplifier 60 flows in only one direction through the field winding 22 of the exciter 20. A commutating rectifier 26 is electrically connected across the field winding 22 of the exciter 20 for commutating the current through the field winding 22. In other words, the rectifier 26 discharges the field 22 cyclically, thus preventing the flow of unwanted feedback into the load windings 132, 134, 136, 138, 140 and 142, which would otherwise render the magnetic amplifier 60 unstable.

In order to apply a three-phase voltage to the load windings 132, 134, 136, 138, 140 and 142 of the magnetic amplifier 60, the three-phase potential transformer 70, which is responsive to the output voltage of the generator 10, and the current transformers 62, 64 and 66, which are responsive to the output current of said generator, are so interconnected as to produce a combined three-phase output voltage at the conductors 220, 230 and 240. In particular, the primary phase windings 74, 76 and 78 of the transformer 70 are Y-connected to the line conductors 16, 18 and 14, respectively. The current transformers 62, 64 and 66 are disposed adjacent to the line conductors 14, 16 and 18, respectively, and the output voltage from said current transformers varies with or is responsive to the output current from the generator 10 which flows in the respective line conductors. The transformer 70 also includes three secondary phase windings 94, 96 and 98, one end of each of said secondary phase windings being connected to the neutral terminal 65 through one of the associated current transformers 62, 64 and 66, respectively. The other ends of the secondary phase windings 94, 96, 98 are connected to the output conductors 220, 230 and 240, respectively. The three-phase output voltage at the conductors 220, 230 and 240 is applied to the load windings of the magnetic amplifier 60 by connecting said conductors to the lower junction points of the load windings 136 and 138, 140 and 142, and 132 and 134, respectively, as shown in the drawing.

In order to bias the magnetic amplifier 60 by a predetermined amount, the magnetic core members 120, 122, 124, 126, 128 and 130 have disposed in inductive relationship therewith the biasing windings 182, 184, 186, 188, 190 and 192, respectively. As illustrated, the biasing windings 182, 184, 186, 188, 190 and 192 are connected in series circuit relation with one another through a rheostat 92 across the output terminals of a full-wave dry-type rectifier 90 whose input terminals are electrically connected to the line conductors 14 and 16 for receiving energy therefrom. The biasing windings 182, 184, 186, 188, 190 and 192 are so disposed on their respective core members that current flow therethrough produces flux which opposes the flux produced by the current flow through the associated load windings 132, 134, 136, 138, 140 and 142, respectively.

For the purpose of saturating the magnetic core members 120, 122, 124, 126, 128 and 130 in accordance with the output signal from the error detecting circuit 40, the control windings 170, 172, 174, 176, 178 and 180 are disposed in inductive relationship with the core members 120, 122, 124, 126, 128 and 130, respectively. As illustrated, the control windings 170, 172, 174, 176, 178 and 180 are so disposed on their respective core members that current flow therethrough produces flux which opposes or aids the flux produced by the current flow through the associated biasing windings 182, 184, 186, 188, 190 and 192, respectively, depending on the bias provided by said bias windings. In this instance, the control windings 170, 172, 174, 176, 178 and 180 are connected in series circuit relationship, the series circuit being connected across the output terminals 46 and 48 of the error detecting circuit 40.

For a purpose which will be discussed hereinafter, the magnetic core members 120, 122, 124, 126, 128 and 130 have disposed in inductive relationship therewith limiting windings 150, 152, 154, 156, 158 and 160, respectively. As illustrated, the limiting windings 150, 152, 154, 156, 158 and 160 are connected in series circuit relationship with one another, the series circuit being connected to the limiting means 100 at the conductors 86 and 88. The limiting windings 150, 152, 154, 156, 158 and 160 are so disposed on their respective core members that current flow therethrough produces flux which opposes the flux produced by the current flow through the associated load windings 132, 134, 136, 138, 140 and 142, respectively. The manner in which the load windings 132, 134, 136, 138, 140 and 142 of the magnetic amplifier 60 receive energy from the potential transformer 70 which includes the secondary phase windings 94, 96 and 98 and from the current transformers 62, 64 and 66 can be better understood by tracing the current flow through these load windings during various phases of the output voltage of the transformer 70. Assuming that the lower end of the secondary phase winding 94 of the transformer 70 is at a positive polarity with respect to the upper end of the winding 94, then current flows from the lower end of the winding 94 through the current transformer 62, the current transformer 64, the secondary phase winding 96, through the conductor 230, through the load winding 142 and the self-saturating rectifier 212 to the conductor 224, through the field winding 22 of the exciter 20, the conductor 222, the self-saturating rectifier 206, the load winding 136 and back to the upper end of the secondary phase winding 94, through the conductor 220. When the lower end of the secondary phase winding 94 is at a positive polarity with respect to the upper end of the winding 94, current also flows from the lower end of the winding 94 through the current transformer 62, the current transformer 66, the secondary phase winding 98 through the conductor 240, the load winding 134, the self-saturating rectifier 204, the conductor 224, the field winding 22 of the exciter 20, the conductor 222, the self-saturating rectifier 206, the load winding 136 and back to the upper end of the winding 94 through the conductor 220.

During the next phase of the output voltage of the transformer 70, in which the right end of the secondary phase winding 96 is at a positive polarity with respect to the left end of the winding 96, current flows from the right end of the winding 96 through the current transformer 64, the current transformer 62, the secondary phase winding 94, the conductor 220, the load winding 138, the self-saturating rectifier 208, the conductor 224, the field winding 22 of the exciter 20, the conductor 222, the self-saturating rectifier 210, the load winding 140, and back to the left end of the winding 96 through the conductor 230. When the right end of the secondary phase winding 96 is at a positive polarity with respect to the left end of said winding, current flows from the right end of said winding through the current transformer 64, the current transformer 66, the secondary phase winding 98, the conductor 240, the load winding 134, the self-saturating rectifier 204, the conductor 224, the field winding 22 of the exciter 20, the conductor 222, the self-saturating rectifier 210, the load winding 140, and back to the left end of the winding 96 through the conductor 230.

During the next phase of the output voltage of the transformer 70 in which the left end of the secondary phase winding 98 is at a positive polarity with respect to the right end of the winding 98, current flows from the left end of said winding through the current transformer 66, the current transformer 64, the secondary phase winding 96, the conductor 230, the load winding 142, the self-saturating rectifier 212, the conductor 224, the field winding 22 of the exciter 20, the conductor 222, the self-saturating rectifier 202, the load winding 132 and back to the right end of the winding 98 through the conductor 240. When the left end of the secondary phase winding 98 is at a positive polarity with respect to the right end of said winding, current also flows from the left end of said winding through the current transformer 66, the current transformer 62, the secondary phase winding 94, the conductor 220, the load winding 140, the self-saturating rectifier 208, the conductor 224, the field winding 22 of the exciter 20, the conductor 222, the self-saturating rectifier 202, the load winding 132 and back to the right end of the secondary phase winding 98 through the conductor 240.

The operation of the regulator system in the absence of the limiting means 100 will now be described. The rheostat 44 of the error detecting circuit is adjusted initially so that an output error signal or voltage appears at the output terminals 46 and 48 of the error detecting circuit 40 which is positive at the terminal 48 with respect to the voltage at the terminal 46. The error voltage or signal is also adjusted so as to be of the proper magnitude to cause an excitation current to appear at the output of the magnetic amplifier 60 which will cause an average value of excitation current to be applied to the excitation field winding 22 of the exciter 20 which will result in a desired value of regulated voltage at the output terminals 13, 15 and 17 of the generator 10. After the rheostat 44 has been adjusted for the desired regulated value of voltage at the output terminals of the generator 10, any change in the output terminal voltage of the generator 10 will result in a change in the output error signal or voltage of the error detecting circuit 40 which appears at the terminals 46 and 48. For example, if the output terminal voltage of the generator 10 should start to drop below the regulated value, the output error voltage of the error detecting circuit 40 at the terminals 46 and 48 will vary as the output terminal voltage of the generator 10 decreases. The effect of a changing voltage at the output terminals 46 and 48 of the error detecting circuit 40 is to change the magnitude or direction of the current flow through the control windings 170, 172, 174, 176, 178 and 180 of the magnetic amplifier 60. The change in magnitude or direction of the current flow through the control windings 170, 172, 174, 176, 178 and 180 changes the magnitude or direction, respectively, of the fluxes produced thereby in the core members 150, 152, 154, 156, 158 and 160, respectively, which fluxes aid or oppose the fluxes produced in the respective core members by the current flow through the load windings 132, 134, 136, 138, 140 and 142, respectively, thereby increasing the output current of the magnetic amplifier 60. With an increase in the output current of the magnetic amplifier 60, the magnitude of the current flow through the field windings 22 of the exciter 20 also increases to thereby increase the voltage across the field windings 12 of the generator 10 and return the output voltage of the generator 10 to its regulated value.

On the other hand, if the output terminal voltage of the generator 10 increases to a value above the desired regulated value, then the output voltage of the error detecting circuit changes correspondingly, and the magnitude of the current flow through the control windings 170, 172, 174, 176, 178 and 180 of the magnetic amplifier 60 also changes or the direction of said current reverses. A change in the magnitude of the current flow through the control windings 170, 172, 174, 176, 178 and 180 or change in the direction of said current flow changes the magnitude or direction of the fluxes produced thereby in the core members 120, 122, 124, 126, 128 and 130, respectively, which fluxes aid or oppose the fluxes produced in the respective core members by the current flow through the load windings 132, 134, 136, 138, 140 and 142, respectively, to thereby decrease the output of the magnetic amplifier 60. A decrease in the output current of the magnetic amplifier 60 decreases the magnitude of the current flow through the field winding 22 of the exciter 20 to thereby decrease the voltage across the field winding 12 of the generator 10 and to thereby return its output voltage to its regulated value.

The manner in which the potential transformer 70 and the current transformers 62, 64 and 66 are interconnected with the magnetic amplifier 60 has several important results. First, since the potential transformer 70 is responsive to the output voltage of the generator 10 and the current transformers 62, 64 and 66 are directly responsive to the output load current of the generator 10, and said transformers are interconnected so as to produce a combined output voltage which is applied to the load windings of the magnetic amplifier 60, the output current of the magnetic amplifier 60 as applied to the field winding 22 of the exciter 20 may be increased without a corresponding change in the output of the error detecting circuit 40. The transient performance of the regulating system 30 is, therefore, improved, and less gain is required in the magnetic amplifier 60 with a resulting improvement in the stability of the regulator system 30.

A second important result of the arrangement described is that even if the line conductors 14, 16 and 18 or the load circuit connected thereto should become shorted or a fault should occur, thereby reducing the output voltage of the transformer 70 to a negligible value, the current transformers 62, 64 and 66 continue to supply voltage to the load windings 132, 134, 136, 138, 140 and 142 of the magnetic amplifier 60, thereby providing field excitation for the generator 10, even when the line conductors 14, 16 and 18 are shorted. In other words, sufficient excitation is assured for the generator 10 during short-circuit or fault conditions so that the output current of the generator 10 is sufficient to actuate associated protective equipment. In the absence of the limiting means 100, however, if the excitation provided to the generator 10 at the slowest operating speed of the prime mover 24 is sufficient, then the excitation provided by the current transformers 62, 64 and 66 under short-circuit conditions will be excessive at the highest operating speed of the prime mover 24.

The limiting means 100 is provided in order to prevent excessive excitation from being supplied to the generator 10 during short-circuit or fault conditions when the prime mover 24 is operating at higher speeds. In particular, the limiting means 100 comprises a three-phase full-wave rectifier 80 whose input terminals are connected at the output of the current transformers 62, 64 and 66. In order to provide a predetermined limiting action during short-circuit or fault conditions, the limiting means 100 also includes a semiconductor diode 82, preferably of the type known to the art as a Zener diode, said diode being connected in series circuit relationship with a current limiting resistor 84 and the limiting windings 150, 152, 154, 156, 158 and 160 of the magnetic amplifier 60, the series circuit being connected across the output terminals of the three-phase rectifier 80 with the diode 82 poled in the reverse direction. The diode 82 is of a type which has a predetermined, non-destructive, reverse breakdown characteristic when the voltage applied to said diode in the reverse direction exceeds a predetermined breakdown voltage.

The operation of the limiting means 100 and the effect of said operation on the operation of the regulator system 30 will now be considered. During the normal operation of the generator 10 and the regulator system 30 in the absence of short-circuit or fault conditions at the line conductors 14, 16 and 18, the limiting means 100 has no effect on the operation of the regulator system 30. This is because the diode 82 is poled in the reverse direction and does not permit current flow from the output of the three-phase rectifier 80 so long as the induced voltages in the current transformers 62, 64 and 66 and the output of the rectifier 80 are below the breakdown voltage of the diode 82. When, however, short-circuit or fault conditions occur at the line conductors 14, 16 and 18 and the corersponding current flow in said conductors increases to a large value, particularly at higher speeds of the prime mover 24 which increase further the short-circuit current flowing in said conductors, the output voltage from the current transformers 62, 64 and 66 will increase correspondingly and cause a corresponding increase in the output voltage of the three-phase rectifier 80. During short-circuit or fault conditions when the output voltage of the rectifier 80 increases to a value in excess of the breakdown voltage of the diode 82, current will flow from the positive terminal of the rectifier 80 through the diode 82 and the resistor 84 and through the limiting windings 150, 152, 154, 156, 158 and 160 of the magnetic amplifier 60. The flux produced by the current flow through the limiting windings 150, 152, 154, 156, 158 and 160 in the core members 120, 122, 124, 126, 128 and 130, respectively, will oppose the flux produced by the current flow in the associated load windings 132, 134, 136, 138, 140 and 142, respectively, and prevent any further increase in the output current of the magnetic amplifier 60 and, in turn, prevent any further increase in the excitation current applied to the field winding 12 of the generator 10 during short-circuit or fault conditions. In other words, the effect of the limiting means 100 is to reduce the excitation current supplied by the regulator system to the field winding 12 of the generator 10 after the output current of the generator 10 reaches a predetermined value during short-circuit or fault conditions. It is to be noted that the value of excitation supplied to the field winding 12 of the generator 10 at slower speeds of the prime mover 24 during short-circuit or fault conditions is not affected by the operation of the limiting means 100.

It is to be understood that one or more additional magnetic amplifiers may be employed in a particular application in accordance with the teachings of the invention as disclosed. It should also be noted that the teachings of the invention may be employed in excitation systems which do not include a separate rotating exciter, such as the exciter 20 shown in the drawing, but instead the excitation current may be supplied directly to the field winding of the synchronous generator 10. It is also clear that the teachings of the invention may also be applied in similar types of excitation systems in which the excitation is obtained from means which are responsive to both the output current and to the output voltage of a dynamoelectric machine, such as a synchronous generator. For example, instead of employing a regulator system of the magnetic amplifier type, as used to illustrate the invention, the excitation may be controlled by regulator systems employing electronic tubes or semiconductor devices, such as transistors, and the limiting means, as disclosed, may be employed to limit the excitation supplied during certain operating conditions. It is also to be understood that other types of semiconductor devices having a reverse breakdown characteristic which may or may not be controllable, such as double-base diodes, may be similarly employed to the semiconductor diode 82 as disclosed.

The apparatus embodying the teachings of this invention has several advantages. For example, the excitation current supplied by an excitation system, as disclosed, at lower speeds of the prime mover driving the associated synchronous generator, is not reduced or affected, and the limiting means does not affect the operation of the associated regulator system during normal operation in the absence of short-circuit or fault conditions at higher speeds of the associated prime mover. In addition, the protective equipment associated with a synchronous generator is not required to handle as large output currents from the associated generator during short-circuit conditions when the speed of the prime mover driving said generator is high. Since the short-circuit current from a generator, as disclosed, is limited to a lower value, the transient recovery voltage at the output of the generator is limited to a lower value upon removal or upon an end to the short-circuit or fault conditions.

Since numerous changes may be made in the above-described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In an excitation system for a synchronous generator having an excitation field winding and output terminals, the combination comprising, first transformer means connected in circuit relation with said output terminals for supplying excitation current in response to the output voltage of said generator, second transformer means connected in circuit relation with said output terminals for supplying excitation current in response to the output current of said generator, a regulator system connected between said first and second transformer means and said field winding for controlling the excitation supplied to said generator by both of said transformer means, and limiting means connected in circuit relation with said regulator system and said second transformer means for limiting the excitation current supplied by second transformer means to said field winding when the output current of said generator reaches a predetermined value, said limting means comprising rectifier means having input terminals connected in circuit relation with said second transformer means and output terminals and a semiconductor device having a predetermined reverse breakdown characteristic associated therewith connected across the output terminals of said rectifier means.

2. In an excitation system for a synchronous generator having an excitation field winding and output terminals, the combination comprising, first transformer means connected in circuit relation with said output terminals for supplying excitation current in response to the output voltage of said generator, second transformer means connected in circuit relation with said output terminals for supplying excitation current in response to the output current of said generator, a regulator system connected between said first and second transformer means and said field winding for controlling the excitation supplied to said generator by said transformer means, and limiting means connected in circuit relation with said regulator system and said second transformer means to be responsive to the output current of said machine for limiting the excitation current supplied by second transformer means to said field winding when the output current of said generator reaches a predetermined value, said limiting means comprising rectifier means having input terminals connected across said second transformer means and output terminals and a semiconductor diode having a predetermined reverse breakdown characteristic connected between the output terminals of said rectifier means and said regulator system.

3. In a regulator system for a synchronous generator having an excitation field winding and output terminals, the combination comprising, first and second transformer means connected in circuit relation with said output terminals for providing excitation current in response to the output voltage and current, respectively, of said generator, an error detector circuit connected to said output terminals for obtaining an error signal which is a measure of the deviation of the output voltage of said generator from its regulated value, control means connected between said field winding and said transformer means for controlling the excitation current supplied to said field winding, said control means being responsive to said error signal to maintain the output voltage of said generator at a predetermined regulated value, and limiting means connected in circuit relation with said second transformer means and said control means for limiting the excitation current supplied to said field winding by said second transformer means when the output current of said generator reaches a predetermined value, said limiting means comprising rectifier means having an input connected in circuit relation with said second transformer means and an output and a semiconductor device connected between the output of said rectifier means and said control means which breaks down when the output current of said machine increases to substantially a predetermined value.

4. In a regulator system for a synchronous generator having an excitation field winding and output terminals, the combination comprising, first and second transformer means connected in circuit relation with said output terminals for providing excitation current in response to the output voltage and current, respectively, of said generator, an error detector circuit connected to said output terminals for obtaining an error signal which is a measure of the deviation of the output voltage of said generator from its regulated value, a magnetic amplifier connected between said field winding and said transformer means for controlling the excitation current supplied to said field winding by both of said transformer means, said magnetic amplifier being responsive to said error signal to maintain the output voltage of said generator at a predetermined regulated value, and limiting means connected in circuit relation with said second transformer means and said magnetic amplifier for limiting the excitation current supplied to said field winding by said second transformer means when the output current of said generator reaches a predetermined value, said limiting means comprising full wave rectifier means having an input connected in circuit relation with said second transformer means and an output and a semiconductor device connected between the output of said rectifier means and said magnetic amplifier having a predetermined reverse breakdown characteristic associated therewith.

5. In a regulator system for a synchronous generator having an excitation field winding and output terminals, the combination comprising, first and second transformer means connected in circuit relation with said output terminals for providing excitation current in response to the output voltage and current, respectively, of said generator, an error detector circuit connected to said output terminals for obtaining an error signal which is a measure of the deviation of the output voltage of said generator from its regulated value, control means connected between said field winding and said transformer means for controlling the excitation current supplied to said field winding, said control means being responsive to said error signal to maintain the output voltage of said generator at a predetermined regulated value, and limiting means connected in circuit relation with said second transformer means for limiting the excitation current supplied to said field winding by said second transformer means when the output current of said generator reaches a predetermined value, said limiting means comprising rectifier means having input terminals connected across the output of said second transformer means and output terminals and a semiconductor diode having a predetermined reverse breakdown characteristic associated therewith connected between the output terminals of said rectifier means and said control means.

6. In a regulator system for a synchronous generator having an excitation field winding and output terminals, the combination comprising, first and second transformer means connected in circuit relation with said output terminals for providing excitation current to said field winding in response to the output voltage and current, respectively, of said generator, an error detector circuit connected to said output terminals for obtaining an error signal which is a measure of the deviation of the output voltage of said generator from its regulated value, a magnetic amplifier having a control winding and a limiting winding, said magnetic amplifier being connected between said field winding and said transformer means for controlling the excitation current supplied to said field winding, the control winding of said magnetic amplifier being connected in circuit relation with said detector circuit to be said magnetic amplifier being responsive to said error signal to maintain the output voltage of said generator at a predetermined regulated value, and limiting means connected in circuit relation with said second transformer means and said magnetic amplifier for limiting the excitation current supplied to said field winding by said second transformer means when the output current of said generator reaches a predetermined value, said limiting means comprising rectifier means having input terminals connected across the output of said second transformer and output terminals and a semiconductor diode having a predetermined reverse breakdown characteristic connected between the output terminals of said rectifier means and said limiting winding of said magnetic amplifier, said diode being poled in the reverse direction.

7. In a regulator system for a synchronous generator having an excitation field winding and output terminals, the combination comprising, first and second transformer means connected in circuit relation with said output terminals for providing excitation current in response to the output voltage and current, respectively, of said generator, an error detector circuit connected to said output terminals for obtaining an error signal which is a measure of the deviation of the output voltage of said generator from its regulated value, a magnetic amplifier connected between said field winding and said transformer means for controlling the excitation current supplied to said field winding, said magnetic amplifier having a first control winding connected in circuit relation with said detector circuit to be responsive to said error signal to maintain the output voltage of said generator at a predetermined regulated value and a second control winding, and limiting means connected in circuit relation with said second transformer means and said magnetic amplifier for limiting the excitation current supplied to said field winding by said second transformer means when the output current of said generator reaches a predetermined value, said limiting means comprising full wave rectifier means having input terminals connected in circuit relation with said transformer means and output terminals and a semiconductor device having a predetermined reverse breakdown characteristic connected across the output terminals of said full wave rectifier means and in circuit relation with said second control winding.

8. In an excitation system for a synchronous generator having an excitation field winding and output terminals, the combination comprising, first transformer means connected in circuit relation with said output terminals for supplying excitation current to said field winding in response to the output voltage of said generator, second transformer means connected in circuit relation with said output terminals for supplying excitation current to said field winding in response to the output current of said generator, a regulator system connected between said first and second transformer means and said field winding for controlling the excitation current supplied to the field winding of said generator by said transformer means, and limiting means connected in circuit relation with said regulator system and said second transformer means for limiting the excitation current supplied to said field winding by second transformer means when the output current of said generator reaches a predetermined value, said limiting means comprising full wave rectifier means having input terminals connected in circuit relation with said transformer means and output terminals and a semiconductor diode having a predetermined reverse breakdown characteristic connected between the output terminals of said full wave rectifier means and said regulator system.

References Cited in the file of this patent

UNITED STATES PATENTS

| | | |
|---|---|---|
| 2,454,582 | Thomson et al. | Nov. 23, 1948 |
| 2,672,585 | Hotson | Mar. 16, 1954 |
| 2,575,332 | Carleton et al. | July 31, 1956 |
| 2,773,233 | Marcks | Dec. 4, 1956 |
| 2,791,740 | McKenna et al. | May 7, 1957 |
| 2,836,786 | Scharstien et al. | May 27, 1958 |
| 2,862,173 | Bobo et al. | Nov. 25, 1958 |
| 2,869,066 | Lutz | Jan. 13, 1959 |
| 2,886,763 | Zelina | May 12, 1959 |
| 2,896,149 | Lowry et al. | July 21, 1959 |
| 2,927,261 | Mittag | Mar. 1, 1960 |

FOREIGN PATENTS

| | | |
|---|---|---|
| 834,163 | France | Nov. 15, 1938 |